Dec. 25, 1928.

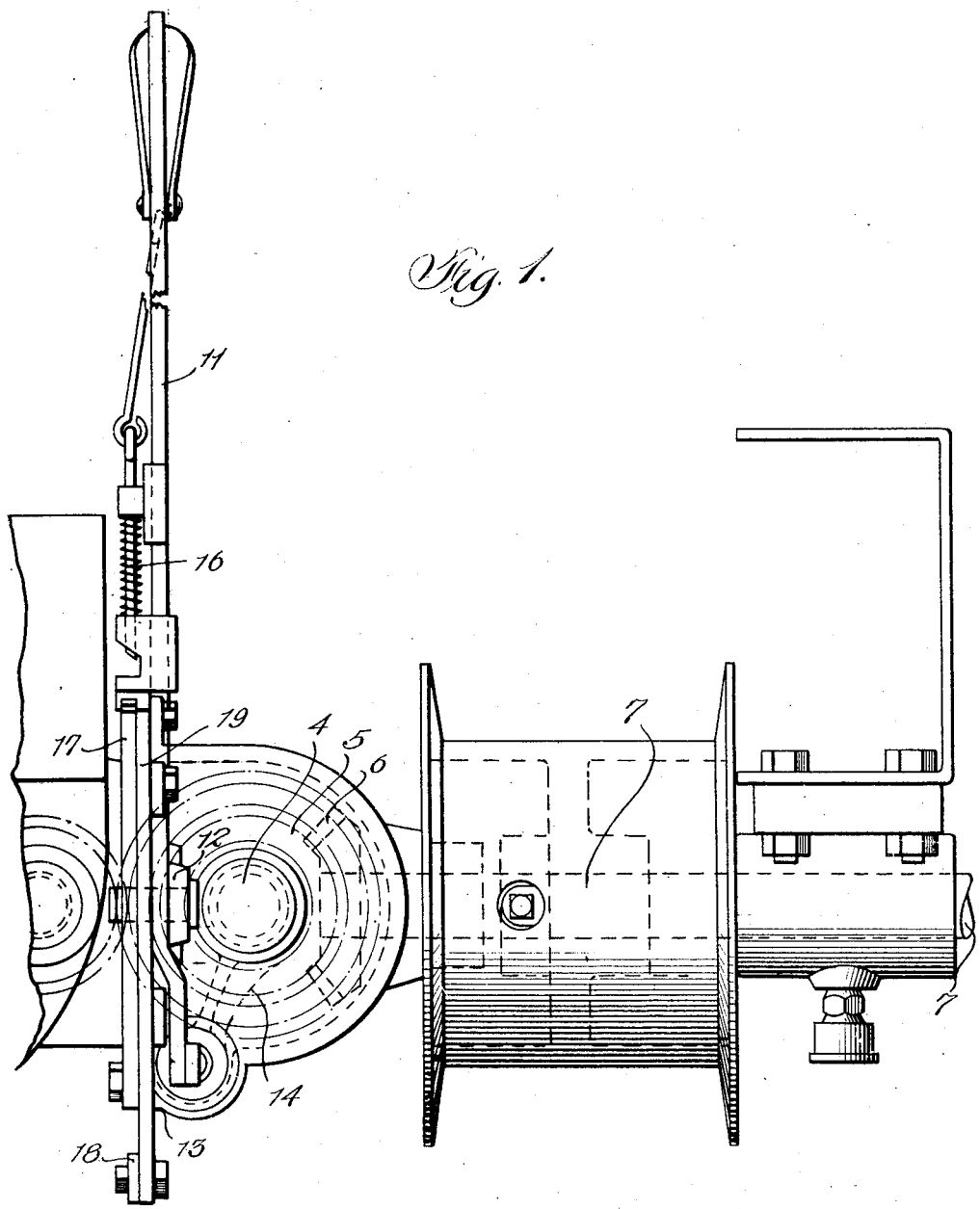

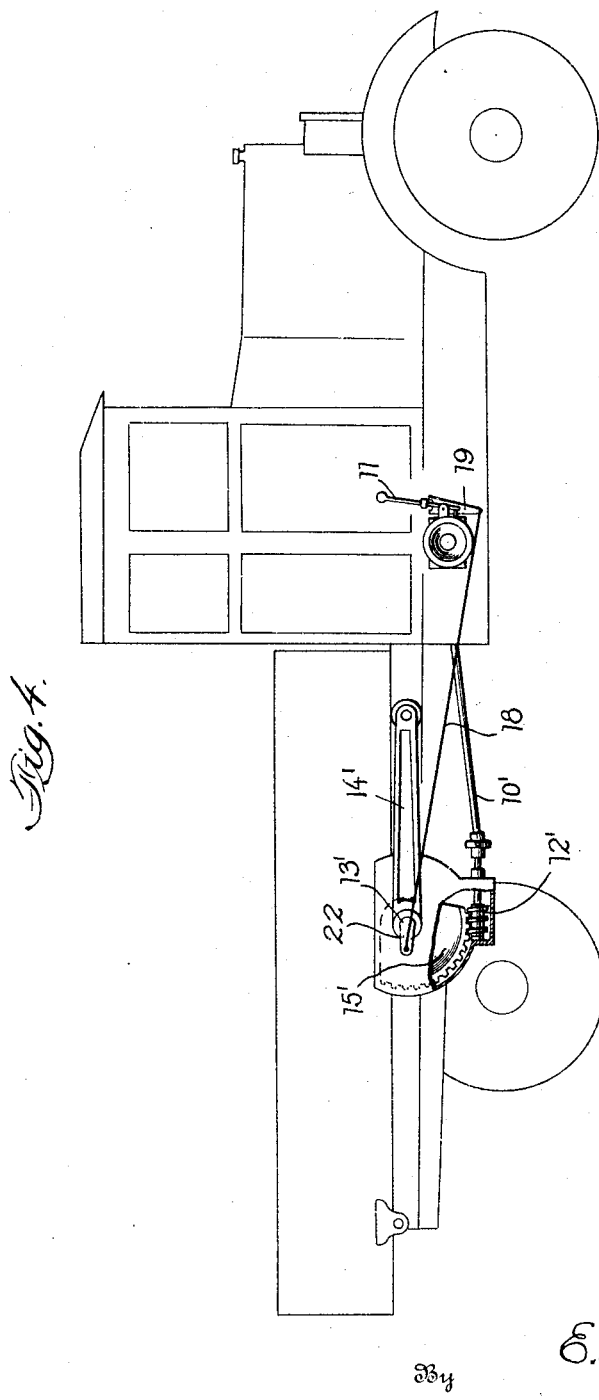

R. F. CRAWFORD 1,696,838

CLUTCH CONTROL FOR TRANSMISSION MECHANISM

Filed Aug. 3, 1926　　3 Sheets-Sheet 2

INVENTOR.
Ralph F. Crawford
BY
E. W. Anderson
ATTORNEY.

Patented Dec. 25, 1928.

1,696,838

UNITED STATES PATENT OFFICE.

RALPH F. CRAWFORD, OF SALINA, KANSAS.

CLUTCH CONTROL FOR TRANSMISSION MECHANISM.

Application filed August 3, 1926. Serial No. 126,852.

The invention has relation to clutch controlling means, having for an object the provision of improved means for automatically controlling the clutch of reversible power transmission mechanism, being especially designed for use with the device of my application for patent for power hoist for dump trucks, S. No. 106,944, whereby when the body of the truck is raised to dumping position or lowered to normal horizontal position, the clutch will be released automatically.

Figure 3:
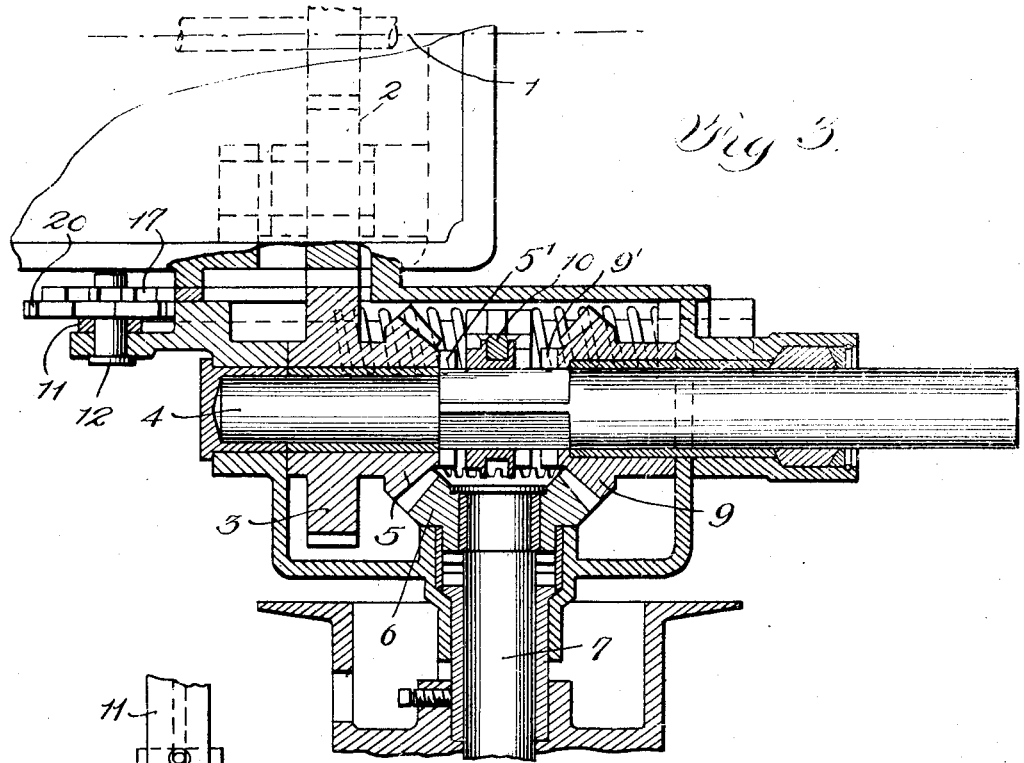
Figure 2:
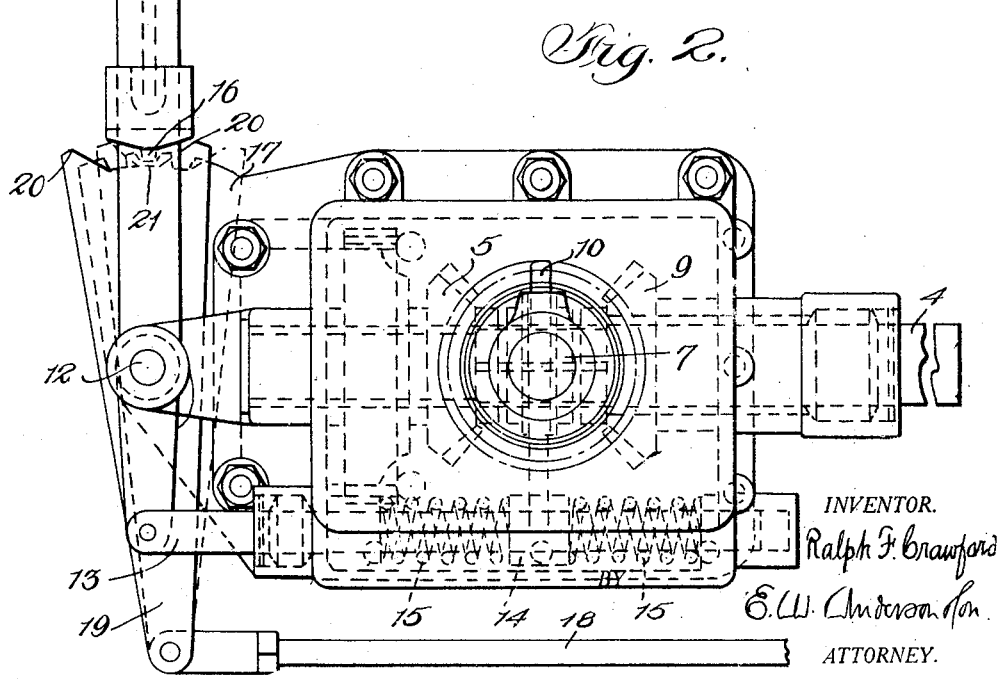

The invention consists in the novel construction and combinations of parts, as set forth in the appended claims. In the accompanying drawings, illustrating an embodiment of the invention, Figure 1 is a side view of the invention; Figure 2 is an end view of the same; Figure 3 is a section on the line 3—3, Figure 2; Figure 4 is a side view of a truck having the invention applied thereto.

In these drawings, the numeral 1 designates the center line of the drive shaft of the vehicle, with which a gear 2 has driving engagement and is in turn in mesh with a gear 3 loosely mounted upon a stub shaft 4, the gear 3 having fast thereto a bevel gear 5, in mesh with a bevel gear 6, the latter being fast upon a countershaft 7, said stub shaft having also thereon a loose bevel gear 9, in mesh with bevel gear 6 and opposite to bevel gear 5.

The bevel gears 5 and 9 have each clutch teeth 5' and 9' facing towards each other and adapted for engagement respectively with the teeth of a shiftable clutch head 10 mounted fast and slidably upon a squared portion of the stub shaft 4 between the bevel gears 5 and 9, whereby when said clutch head is engaged with the clutch teeth of the gear 5 the stub shaft 4 will be driven in the one direction or forwardly and when said clutch head is engaged with the clutch teeth of the other gear 9 said stub shaft will be driven in the other direction or reversely.

A manually operable clutch control lever 11 is fulcrumed at 12 and is adapted through link 13 and a lateral extension 14 of said clutch head 10 to operate the clutch head in the one or the other direction for the purpose stated, said link passing loosely through a perforation of said extension and having surrounding the same coiled springs 15, 15, one at each side of said extension and normally evenly balanced to hold the clutch control lever at neutral position with the clutch disengaged.

The clutch control lever being thrown to clutch position in the one or the other direction, the link 13 will be operated to move said extension 14 and the clutch head 10 one or the other of said springs being at the same time tensioned (the springs at their outer ends having stop engagement with the clutch housing) so that when the spring pressed pawl 16 of said lever engaging the teeth of a segment rack 17 is released, the tensioned spring will act to return the clutch control lever and the clutch head to neutral inactive position, with the parts out of clutch.

In order to provide for the automatic disengagement of the clutch when the body of the truck has been brought to fully raised or fully lowered position as the case may be, a control rod 18 is continuously moved in the one or the other direction by suitable means to be described, to move a lever 19 fulcrumed at 12 and the upper arm of which is provided at each end with a cam rise 20, connected by a low portion 21 forming a recess wherein fits the lower end of the pawl of the clutch control lever.

The dump body of the truck having arrived at fully raised or fully lowered position, the lever 19 will have been moved sufficiently in the one or the other direction to cause one of the cam surfaces thereof to have raised the pawl 16 from engagement with the teeth of the segment rack 17, whereupon the springs 15 will act to throw or snap the clutch head and the clutch lever to neutral position with the parts out of clutch.

The control rod 18 is moved continuously in the one or the other direction during the movement of the dump body of the truck upwardly or downwardly by means of a crank 22 upon the shaft 13' of my aforesaid application, wherein the countershaft is rotated by power take off means from the drive shaft of the engine, a power take off shaft 10' carrying fast thereto the worm 12', which rotates the worm wheel segment 15' upon shaft 13', the latter carrying the lifting arms 14'.

I claim:

1. In an automatic clutch control for power transmission mechanism, driving means, driven means, a clutch connection between said driving means and said driven means including a clutch control lever manually operable from neutral to clutch position and having a spring pressed pawl and a segment rack engaged thereby to hold the adjustment, and means operable by said driven means to automatically return the clutch control lever from clutch position to neutral position upon a predetermined movement of said driven means including a reciprocatory cam device for raising said pawl from engagement with the teeth of said rack and a spring tensioned in the movement of said clutch control lever from neutral to clutch position.

2. In an automatic clutch control for reversible power transmission mechanism, driving means, driven means, a clutch connection between said driving means and said driven means including a clutch control lever manually operable from neutral position to clutch position for forward or reverse operation and having a spring pressed pawl and a segment rack engaged thereby to hold the adjustment, and means operable by said driven means to automatically return the clutch control lever from clutch position for forward or reverse operation to neutral position upon predetermined movement of said driven means in either direction and including a reciprocatory cam device for raising said pawl from engagement with the teeth of said rack, and balanced springs tensioned in the movement of said clutch control lever from neutral to clutch position.

3. In an automatic clutch control for power transmission mechanism, driving means, driven means, a clutch connection between said driving means and said driven means including a clutch control lever manually operable from neutral position to clutch position for forward or reverse operation and having a spring pressed pawl and a segment rack engaged thereby to hold the adjustment, and means operable by said driven means to automatically return the clutch control lever from clutch position for forward or reverse operation to neutral position upon predetermined movement of said driven means in either direction and including a pivoted arm having opposite cams laterally adjacent the teeth of said rack and a crank member having operating connection with said arm, one or the other of said cams engaging said pawl to raise the same from engagement with the teeth of said rack, and balanced springs tensioned in the movement of said clutch control lever from neutral to clutch position.

In testimony whereof I affix my signature.

RALPH F. CRAWFORD.